(12) United States Patent
Chen et al.

(10) Patent No.: US 12,203,373 B2
(45) Date of Patent: Jan. 21, 2025

(54) AUTOMATIC MICROSEISMIC MONITORING-INTELLIGENT ROCKBURST EARLY WARNING INTEGRATED SYSTEM AND METHOD FOR TUNNEL BORING MACHINE (TBM)-BASED CONSTRUCTION

(71) Applicant: INSTITUTE OF ROCK AND SOIL MECHANICS,CHINESE ACADEMY OF SCIENCES, Wuhan (CN)

(72) Inventors: Bingrui Chen, Wuhan (CN); Xu Wang, Wuhan (CN)

(73) Assignee: INSTITUTE OF ROCK AND SOIL MECHANICS,CHINESE ACADEMY OF SCIENCES, Wuhan (CN)

( * ) Notice: Subject to any disclaimer, the term of this patent is extended or adjusted under 35 U.S.C. 154(b) by 134 days.

(21) Appl. No.: 18/145,090

(22) Filed: Dec. 22, 2022

(65) Prior Publication Data

US 2023/0128787 A1    Apr. 27, 2023

(30) Foreign Application Priority Data

Mar. 28, 2022 (CN) .......................... 202210315604.X

(51) Int. Cl.
*E21D 9/00* (2006.01)
*E21F 17/18* (2006.01)
(Continued)

(52) U.S. Cl.
CPC .............. *E21D 9/003* (2013.01); *E21F 17/18* (2013.01); *G01V 1/003* (2013.01); *G01V 1/288* (2013.01);
(Continued)

(58) Field of Classification Search
CPC ........ E21D 9/003; E21F 17/18; E21F 17/185; E21F 17/00; G01V 1/003; G01V 1/288;
(Continued)

(56) References Cited

U.S. PATENT DOCUMENTS

| | | | |
|---|---|---|---|
| 2015/0233242 A1* | 8/2015 | Li | ........................ G01S 13/885 342/22 |
| 2017/0218757 A1* | 8/2017 | Li | .......................... G01V 1/162 |

(Continued)

FOREIGN PATENT DOCUMENTS

| | | | |
|---|---|---|---|
| AU | 2020102355 A4 * | 10/2020 | |
| CN | 105572231 A | 5/2016 | |

(Continued)

OTHER PUBLICATIONS

Shiyong Wu et al., "Effect of Excavation Schemes of TBM on Risk of Rock Burst of Long Tunnels at Jinping II Hydropower Station", Chinese Journal of Rock Mechanics and Engineering, vol. 34, No. 4, pp. 728-734.

*Primary Examiner* — Richard A Hansell, Jr.

(57) ABSTRACT

An automatic microseismic monitoring-intelligent rockburst early warning integrated system for TBM-based construction includes a partition plate, a guide rail, a sensor festoon bracket, a trolley festoon bracket, and a trolley. The trolley is provided with a drive wheel adapted and connected to the guide rail. The sensor festoon bracket is provided with a microseismic sensor festoon, and the trolley festoon bracket is provided with a trolley festoon. The trolley is provided with a collaborative robot for clamping a removable anchoring device, and a collaborative robot control cabinet connected thereto. An automatic microseismic monitoring-intelligent rockburst early warning integrated method is further provided.

4 Claims, 8 Drawing Sheets

(51) Int. Cl.
*G01V 1/00* (2024.01)
*G01V 1/28* (2006.01)
*H04N 7/18* (2006.01)
*H04N 23/90* (2023.01)

(52) U.S. Cl.
CPC ............... *H04N 7/18* (2013.01); *H04N 23/90* (2023.01); *G01V 2200/16* (2013.01)

(58) Field of Classification Search
CPC ........ G01V 2200/16; G01V 1/22; G01V 1/24; G01V 1/523; G01V 2001/526; G01V 2210/123; G01V 2210/65; G01V 1/42; H04N 7/18; H04N 23/90; B25J 5/02; B25J 11/00; B25J 13/06; E21B 23/00; E21B 47/002
See application file for complete search history.

(56) References Cited

U.S. PATENT DOCUMENTS

| | | | |
|---|---|---|---|
| 2018/0359944 A1* | 12/2018 | Millar | A01G 7/045 |
| 2020/0230005 A1* | 7/2020 | Hidler | A61G 7/1042 |
| 2020/0240268 A1 | 7/2020 | Li et al. | |
| 2020/0284934 A1* | 9/2020 | Chen | G01V 1/48 |
| 2022/0082020 A1* | 3/2022 | Wang | E21B 7/046 |
| 2022/0146389 A1* | 5/2022 | Liu | E21D 9/003 |
| 2022/0363293 A1* | 11/2022 | McFarlane | B66C 7/02 |
| 2023/0332504 A1* | 10/2023 | Khorshidi | E21D 11/083 |

FOREIGN PATENT DOCUMENTS

| | | | | |
|---|---|---|---|---|
| CN | 210323399 U | | 4/2020 | |
| CN | 111520192 A | * | 8/2020 | ............. E21F 17/18 |
| CN | 112177622 A | | 1/2021 | |
| JP | 2019199708 A | | 11/2019 | |

* cited by examiner

AUTOMATIC MICROSEISMIC MONITORING-INTELLIGENT ROCKBURST EARLY WARNING INTEGRATED SYSTEM AND METHOD FOR TUNNEL BORING MACHINE (TBM)-BASED CONSTRUCTION

CROSS-REFERENCE TO RELATED APPLICATIONS

This application claims the benefit of priority from Chinese Patent Application No. 202210315604.X, filed on Mar. 28, 2022. The content of the aforementioned application, including any intervening amendments thereto, is incorporated herein by reference in its entirety.

TECHNICAL FIELD

This application relates to micro-seismic monitoring, and more particularly to an automatic microseismic monitoring-intelligent rockburst early warning integrated system and method for tunnel boring machine (TBM)-based construction.

BACKGROUND

Tunnel boring machine (TBM) is a highly integrated and mechanized rock tunnel boring machine. TBM can cut the rock tunnel face by a cutter head, transport the broken rock by a conveyor belt, anchor the rock mass by a roof bolter, assemble the steel arch support by a steel arch installation machine, and spray the concrete by a shotcrete bridge, thereby facilitating the fast, safe, and high-quality construction of the rock tunnel. Therefore, the TBM has been widely used in the tunnel construction.

The current tunnel construction is usually conducted in an engineering condition with poor rock quality, high buried depth, and large in-situ stress. Under this geological condition, the excavation of the surrounding rock will cause stress redistribution, and the internal strain energy will gradually be accumulated and instantaneously release, resulting in the rockburst disaster. Rockburst is one of the typical dynamic hazards in the tunnel construction and will cause rock fracture and affect the lining effect, and even threaten safety of construction personnel, damage the TBM and trigger local collapse seriously hindering the construction progress.

In order to prevent rockburst effectively and reasonably, there is an urgent need to develop a monitoring method that can provide accurate early warning for the rock bursts. The microseismic monitoring technology can monitor the elastic energy released from the rock fracture in the surrounding rock and analyze the space-time and energy-level information thereof to perform accurate rockburst early warning. The microseismic monitoring technology is based on a microseismic sensor embedded in the surrounding rock to monitor the vibration signal of the rock fracture. Therefore, in order to ensure that the microseismic monitoring system can always cover the area near the tunnel face in the TBM construction, it is required to frequently remove and install the microseismic sensor according to the construction progress. Moreover, considering that the sensors are generally mounted near the tunnel face, the active rockburst will seriously threaten the personnel safety. At the same time, in the existing methods, it is needed to rewire the sensor cables every time the sensor is removed and installed, which is time-consuming and seriously affects the continuity of the microseismic monitoring. In addition, the current microseismic data processing methods mainly rely on manual identification of the microseismic signals to select effective rock fracture signals, so as to locate the fracture events. Unfortunately, these methods are labor-intensive and time-consuming, resulting in a large period in which it fails to provide effective rockburst warning. Therefore, it is urgent to provide a method that can avoid frequent manual removal and installation of sensors and shorten the window period between microseismic monitoring and rockburst warning.

SUMMARY

In view of the deficiencies of excessive manual operation, high safety risk, large time consumption, poor microseismic monitoring accuracy and timeliness in the prior art, this application provides an automatic microseismic monitoring-intelligent rockburst early warning integrated system and method for TBM-based construction.

For the convenience of description, as used herein, the "front" refers to a direction in which the TBM is close to the tunnel face; the "rear" refers to a direction in which the TBM is away from the tunnel face; the "left" refers to the left side when standing on the TBM facing the tunnel face; the "right" refers to the right side when standing on the TBM facing the tunnel face; the "top" refers to a direction of the TBM approaching the vault; the "bottom" refers to a direction of the TBM approaching the floor; the "outside" refers to a direction pointing from the TBM section to the tunnel wall, and the "inside" refers to a direction pointing from the TBM section to the center of the tunnel section.

Technical solutions of this application are described as follows.

In a first aspect, this application provides an automatic microseismic monitoring-intelligent rockburst early warning integrated system for tunnel boring machine (TBM)-based construction, including:
  a partition plate arranged in a main body of a tunnel boring machine;
  a guide rail;
  a sensor festoon bracket;
  a trolley festoon bracket; and
  a trolley;
  wherein the guide rail, the sensor festoon bracket and the trolley festoon bracket are provided on the partition plate; the trolley is provided with a drive wheel adapted and connected to the guide rail; the sensor festoon bracket is provided with a microseismic sensor festoon, and the trolley festoon bracket is provided with a trolley festoon; the trolley is provided with a collaborative robot for clamping a removable anchoring device, and is also provided with a collaborative robot control cabinet connected to the collaborative robot; and the guide rail is provided with a graduation for marking a position of the trolley.

In an embodiment, the trolley is further provided with a first camera and a second camera; the first camera is configured to observe a lining, a drill hole and the collaborative robot; the second camera is configured to observe rail segments in front of and behind the trolley and a coordinate of the trolley on the guide rail; and the collaborative robot is provided with a third camera for observing the drill hole and the removable anchoring device.

In an embodiment, network cables and power supply cables of the third camera, the first camera, the second camera and the collaborative robot control cabinet are all assembled into cables of the trolley and are maintained through the trolley festoon; a microseismic sensor is sleevedly provided in the removable anchoring device; and a cable of the microseismic sensor extends from the removable anchoring recovery device at a position close to an end of the removable anchoring device clamped by the collaborative robot, and is maintained by the microseismic sensor festoon.

In an embodiment, the automatic microseismic monitoring-intelligent rockburst early warning integrated system further includes:

a TBM console;
a microseismic acquisition instrument;
a center console; and
a microseismic monitoring server;
wherein the microseismic acquisition instrument is placed on a trailer of the TBM; a first photoelectric converter is provided on the trailer, and a second photoelectric converter is arranged outside the tunnel; and the center console is arranged outside the tunnel;

the microseismic sensor is configured to convert monitored microseismic waves into analog electrical signals and transmit the analog electrical signals to the microseismic acquisition instrument; the microseismic acquisition instrument is configured to convert the analog electrical signals into microseismic digital electrical signals and transmit the microseismic digital electrical signals to the microseismic monitoring server; the microseismic monitoring server is configured to analyze the microseismic digital electrical signals to obtain early warning digital electrical signals, and transmit the early warning digital electrical signals to the TBM console for display; the microseismic monitoring server is also configured to transmit the early warning digital electrical signals to the first photoelectric converter; the first photoelectric converter is configured to convert the early warning digital electrical signals into optical signals and transmit the optical signals to the second photoelectric converter through an optical fiber; and the second photoelectric converter is configured to convert the optical signals into digital electrical signals and transmits the digital electrical signals to the center console;

the collaborative robot is electrically connected to the collaborative robot control cabinet; and digital communication electrical signals of the third camera, the first camera, the second camera and the collaborative robot control cabinet are configured to be transmitted to the trolley; a digital communication electrical signal of the trolley is configured to be transmitted to the first photoelectric converter; the first photoelectric converter is also configured to convert the digital communication electrical signal of the trolley into a communication optical signal of the trolley and transmit the communication optical signal of the trolley to the second photoelectric converter; and the second photoelectric converter is also configured to convert the communication optical signal of the trolley into electrical signals and transmits the electrical signals to the center console.

This application further provides an automatic microseismic monitoring-intelligent rockburst early warning integrated method using the automatic microseismic monitoring-intelligent rockburst early warning integrated system, including:

(a1) before removing the microseismic sensor, moving the trolley along the guide rail to a position of the microseismic sensor;

(a2) controlling the collaborative robot to align with and clamp a tail end of the removable anchoring device;

(a3) rotating reversely, by the collaborative robot, the tail end of the removable anchoring device to drive the microseismic sensor to reversely rotate, so as to release the removable anchoring device from the drill hole; and (a4) retracting the collaborative robot to pull the microseismic sensor and the removable anchoring device out of the drill hole;

(b1) moving the trolley along the guide rail to drive the collaborative robot with the microseismic sensor and the removable anchoring device to move to a position corresponding to a new drill hole;

(b2) starting a brake of the trolley to prevent sliding, and adjusting the collaborative robot to allow the microseismic sensor to align with the new drill hole with the help of the first camera and the third camera;

(b3) controlling the collaborative robot to stretch to push the microseismic sensor and the removable anchoring device into the new drill hole;

(b4) rotating, by the collaborative robot, the tail end of the removable anchoring device to spread the removable anchoring device to be coupled with the new drill hole; and (b5) controlling the collaborative robot to release the tail end of the removable anchoring device; retracting the collaborative robot to remove another microseismic sensor; and repeating steps (a1) to (b5) until all microseismic sensors are removed and installed;

(c1) resetting the collaborative robot; moving the trolley back to an end of the guide rail, and starting the brake;

(c2) when the TBM travels forward, fixing the microseismic sensor in the new drill hole with a relative displacement with the TBM, and automatically releasing, by the microseismic sensor festoon, cables of the microseismic sensor;

(c3) calculating a real-time coordinate of the microseismic sensor, and analyzing and processing monitored microseismic signals in combination with the real-time coordinate of the microseismic sensor; and outputting analysis and processing results to the TBM console and the center console; and (c4) determining whether a tunnelling distance of the TBM is greater than or equal to a reinstallation distance of the microseismic sensor; if so, triggering automatic removal and installation of the microseismic sensor, and repeating steps (a1) to (c4); otherwise, continuing to analyze and process the microseismic signals.

Compared to the prior art, this application has the following beneficial effects.

1. By means of the system provided herein, the microseismic sensor can be remotely removed and installed automatically, thereby ensuring safety of construction personnel and reducing labor costs.

2. This application can unwind the wires automatically, greatly reduce the time required for removing and installing the microseismic sensor, and ensure the continuous microseismic monitoring.

3. This application can automatically and intelligently correct the coordinate of the microseismic sensor. Compared with the existing manual measurement, this application has better precision and high automation degree, thereby improving the precision of the microseismic monitoring and rockburst early warning.

4. This application can realize the automatic microseismic monitoring and improve the mechanization and automation degree of the TBM construction.

In the figures: 1—surrounding rock; 2—lining; 3—TBM main body; 31—partition plate; 4—microseismic sensor festoon; 5—drill hole; 6—microseismic sensor; 7—removable anchoring device; 8—collaborative robot; 9—trolley; 10—guide rail; 11—trolley festoon; 12—third camera; 13—first camera; 14—second camera; 15—collaborative robot control cabinet; 16—microseismic acquisition instrument; 17—TBM console; 18—microseismic monitoring server; 19—center console; and 20—photoelectric converter.

DETAILED DESCRIPTION OF EMBODIMENTS

The disclosure will be further described in detail below with reference to the embodiments and accompanying drawings to facilitate the understanding and implementation of the technical solutions of the disclosure. It should be understood that the embodiments described herein are only used to illustrate and explain this application, which are not intended to limit the disclosure.

In view of the deficiencies of excessive manual operation, high safety risk, large time consumption, difficult coordinate measurement, poor microseismic monitoring accuracy and timeliness in the prior art, this application provides an automatic microseismic monitoring-intelligent rockburst early warning integrated system and method for TBM-based construction.

Figure 1:
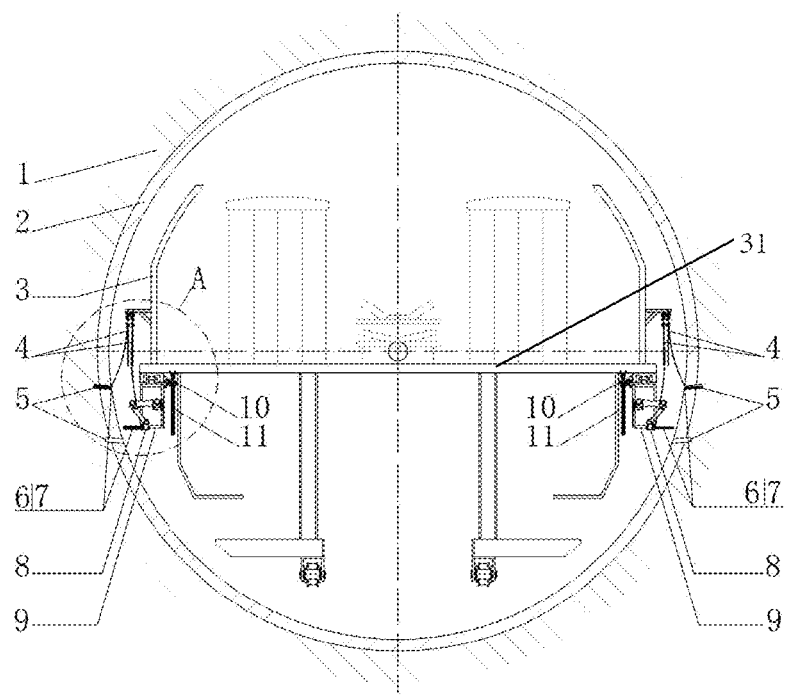
FIG. 1 is a cross-sectional view of an automatic microseismic monitoring-intelligent rockburst early warning integrated system for TBM-based construction according to a first embodiment of the present disclosure.
Figure 2:
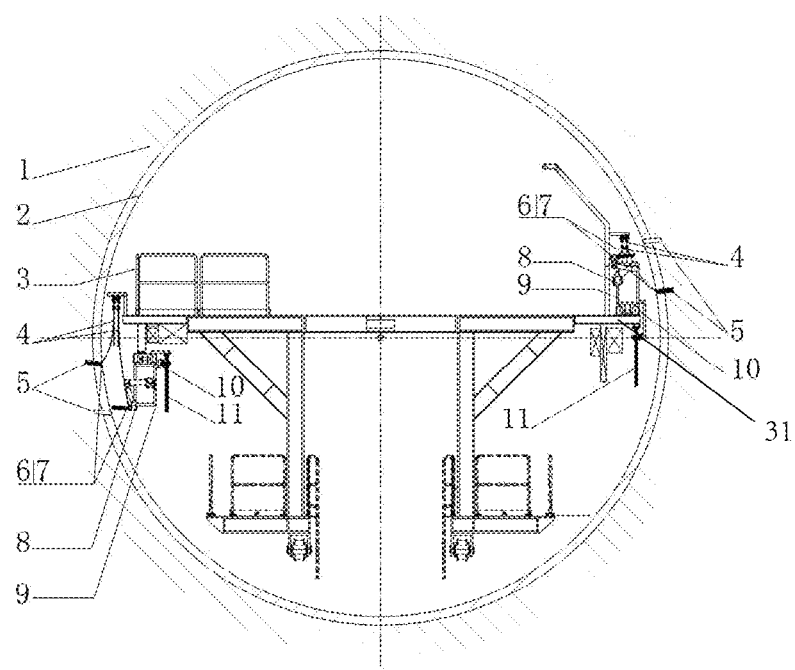
FIG. 2 is a cross-sectional view of an automatic microseismic monitoring-intelligent rockburst early warning integrated system for TBM-based construction according to a second embodiment of the present disclosure.

1. Automatic Microseismic Monitoring-Intelligent Rockburst Early Warning Integrated System for Tunnel Boring Machine (TBM)-Based Construction As shown in FIGS. 1 and 2, the equipment arrangement of the automatic microseismic monitoring-intelligent rockburst early warning integrated system for tunnel boring machine (TBM)-based construction needs to consider the structural differences of the TBM main bodies 3 and ensure non-interference of cable routing. As shown in FIG. 1, there is a sufficient space respectively provided in the lower left side and lower right side of a partition plate 31 in a middle of the TBM main body 3, and it is continuous and unobstructed on an axial direction, so the lower left and lower right sides of the partition plate 31 in the middle can be provided with a guide rail 10 and a trolley festoon 11. For preventing the mutual interference between the trolley festoon 11 and the microseismic sensor festoon 4, several microseismic sensor festoons 4 are arranged on the upper left and upper right sides of the partition plate 31 in the middle; and each microseismic sensor 6 is provided with one microseismic sensor festoon 4.

As shown in FIG. 2, in this embodiment, the TBM main body lacks space in the lower right side thereof due to the obstacles, but there is sufficient space on the upper right side. For preventing the mutual interference between the trolley festoon 11 and the microseismic sensor festoon 4, one guide rail 10 and one trolley festoon 11 are arranged at the lower left side of the partition plate 31 in the middle of the TBM main body 3, and several microseismic sensor festoons 4 are arranged at the upper left side of the partition plate 31 in the middle of the TBM main body 3. One trolley festoon 11 is arranged at the lower right side, and each microseismic sensor 6 is provided with one microseismic sensor festoon 4.

Figure 3:
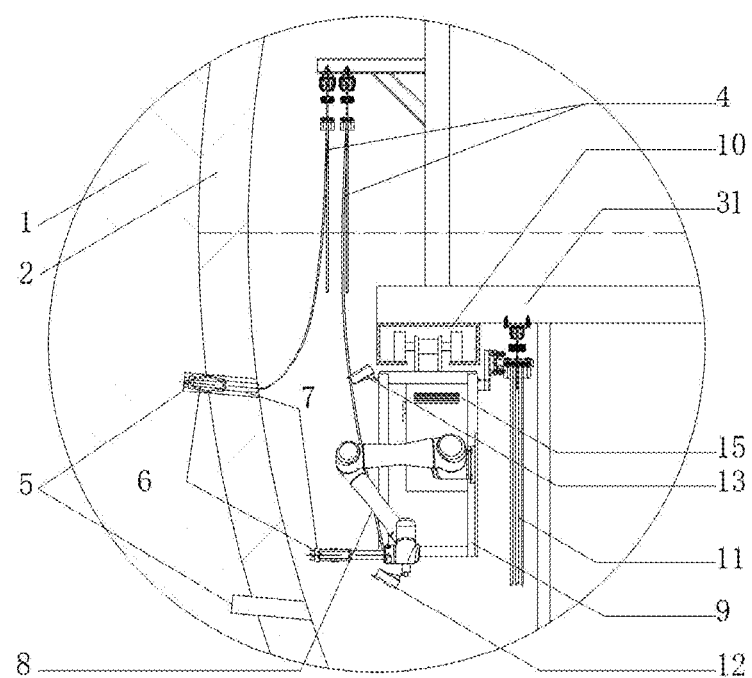
FIG. 3 is an enlarged view of part A in FIG. 1.
Figure 4:
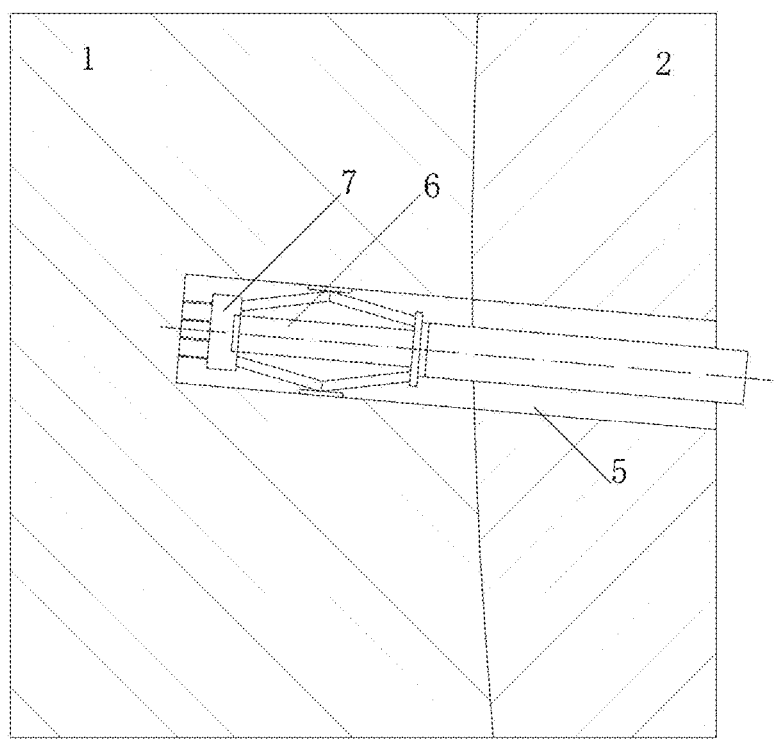
FIG. 4 schematically shows the installation of a microseismic sensor according to an embodiment of the present disclosure.
Figure 5:
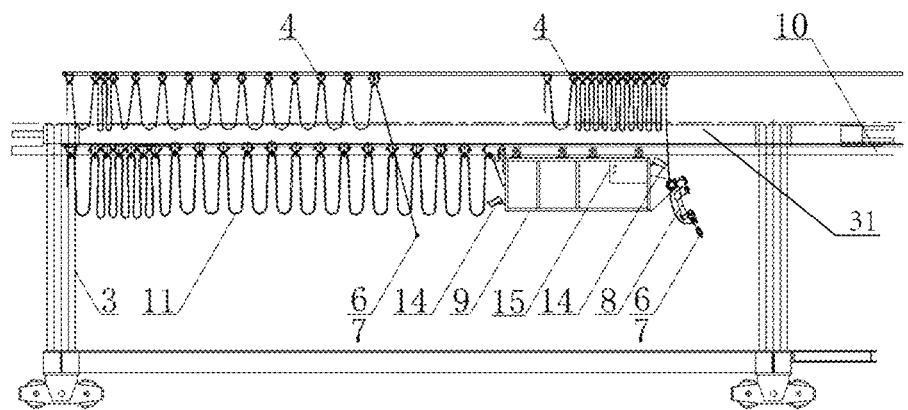
FIG. 5 is a left side view of the system according to an embodiment of the present disclosure.

Referring to FIGS. 3-5, when the automatic microseismic monitoring-intelligent rockburst early warning integrated system for tunnel boring machine (TBM)-based construction is specifically arranged, the guide rail 10 is axially fixed on a bottom surface of the partition plate 31 in the TBM, and the guide rail 10 refers a C-shaped rail or an I-shaped rail. The guide rail 10 is marked with a graduation for determining a position of the trolley 9. The trolley 9 is hung on the guide rail 10 and can travel forward and backward along the guide rail 10. The trolley festoon 11 is on the inner side of the trolley 9 and arranged along a TBM axis, the first trolley on the trolley festoon 11 is fixed to the trolley 9, and the power supply cable and the network cable of the trolley 9 are maintained through the trolley festoon 11 during the movement of the trolley 9. A base flange of a collaborative robot 8 is mounted on a protruding triangular plate on the rear side of the trolley 9, thereby ensuring that the collaborative robot 8 will not interfere with the trolley 9 during movement. A first camera 13 is arranged on an outer side of the trolley 9 to observe a lining 2, a drill hole 5 and the collaborative robot 8 according to the actual situation, and a second camera 14 is arranged on in front of and behind the trolley 9 to observe rail segments in front of and behind the guide rail 10 carrying the trolley 9 and the coordinate of the trolley 9 on the guide rail 10. A third camera 12 is mounted on a wrist of the collaborative robot 8 for observing the positional relationship between the drill hole 5 and the removable anchoring device 7. The network cables and power supply cables of the third camera 12, the first camera 13 and the second camera 14 are all assembled into the network cables and the power supply cables of the trolley 9. The collaborative robot control cabinet 15 is mounted in the trolley 9 for controlling the collaborative robot 8, and the power supply cables and network cables of the collaborative robot control cabinet 15 are merged into the power supply cables and network cables of the trolley 9. The drill holes 5 is pre-drilled during the on-site excavation construction, a diameter of the drill hole 5 is equal to an outer diameter of the removable anchoring device 7 when it is spread. A depth of the drill hole 5 should not be less than a total length of the removable anchoring device 7 and ensures that the drill hole 5 passes through the lining 2 and drills into the surrounding rock 1. The drill hole 5 should have a certain upward inclination angle to facilitate drainage. For ensuring the effect of microseismic monitoring, the drill holes 5 are opened on different section heights. The microseismic sensor 6 is sleevedly provided in the removable anchoring device 7, a cable of the microseismic sensor 6 extends from the removable anchoring device 7 at a position close to an end of the removable anchoring device 7 clamped by the collaborative robot 8 and is maintained by the microseismic sensor festoon 4 during the movement of the trolley or during the movement of the TBM. The removable anchoring device 7 can stretch and withdraw by rotating the end thereof clamped by the collaborative robot 8. When the microseismic sensor 6 needs to be mounted, the removable anchoring device 7 stretches and installs the microseismic sensor 6 in the drill hole 5. When the microseismic sensor 6 needs to be removed, the removable anchoring device 7 can be shrunken for removing. For preventing mutual interference between the festoons, the microseismic sensor festoons 4 are arranged on the partition plate 31 in the middle of TBM main body 3 along the axial direction of the TBM, and each microseismic sensor festoon 4 corresponds to one microseismic sensor 6. The length of each microseismic sensor festoon 4 is determined according to the relative distance of each microseismic sensor 6 and the TBM in the working process.

As shown in FIGS. 5-8, when the automatic microseismic monitoring-intelligent rockburst early warning integrated system for tunnel boring machine (TBM)-based construction is arranged axially, in this embodiment, the TBM console 17 and the microseismic monitoring server 18 are arranged in the TBM main engine control room. The microseismic acquisition instrument 16 is placed in a matched trailer behind the TBM. A photoelectric converter 20 on the TBM is placed on the matched trailer behind the TBM, and another photoelectric converter 20 outside the tunnel is placed in an office outside the tunnel. The central console 19 is placed in the office outside the tunnel. The guide rail 10, the trolley 9, the equipment or structures numbered 4 to 15 should be arranged in the area behind the TBM shotcrete bridge.

Figure 6:
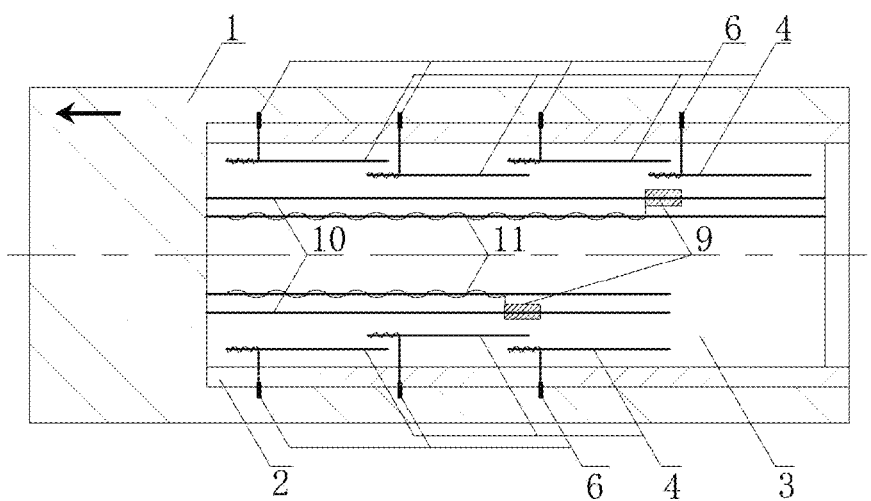
FIG. 6 is a top view showing the wire connection at an initial stage.
Figure 7:
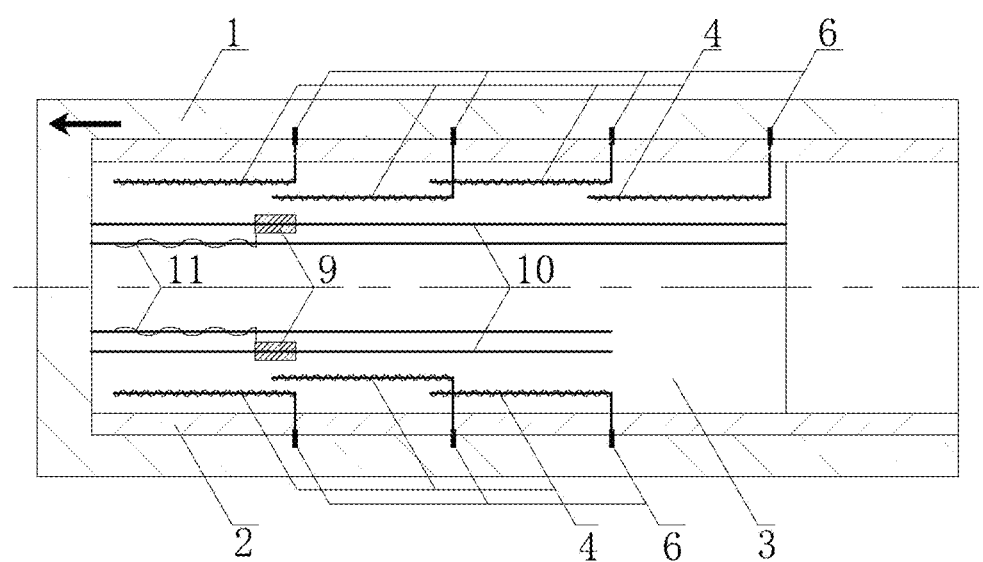
FIG. 7 is a top view showing the wire connection when the microseismic sensor needs to be removed.

Further, with reference to FIGS. 6 and 7, the microseismic sensors 6 are arranged at certain intervals along the axial direction of the TBM, and the number and position of the microseismic sensors 6 are arranged according to the actual construction conditions of the TBM. In this embodiment, since some trailers on the left side of the TBM have obstacles such as belt conveyors at the rear, the available space on the left side is smaller than that on the right side, so three microseismic sensors 6 are arranged on the left side of the TBM, and four microseismic sensors 6 are arranged on the right side of the TBM. Each microseismic sensor festoon 4 should cover the relative stroke between the corresponding microseismic sensor 6 and the TBM in the whole working process. A length of each microseismic sensor festoon 4=a length of the trolley festoon garage+a tunning distance of the reinstalled microseismic sensor+a reserved surplus length. Each guide rail 10 should cover an entire stroke of the corresponding trolley 9, that is, a total stroke of the corresponding microseismic sensor 6 at the side. In this embodiment, the guide rail 10 on the left should cover the entire stroke of the three microseismic sensors 6 on the left side, and the right guide rail 10 should cover the entire stroke of the four microseismic sensors 6 on the right side. The length of each trolley festoon 11 is the same as that of the corresponding guide rail 10.

Figure 8:
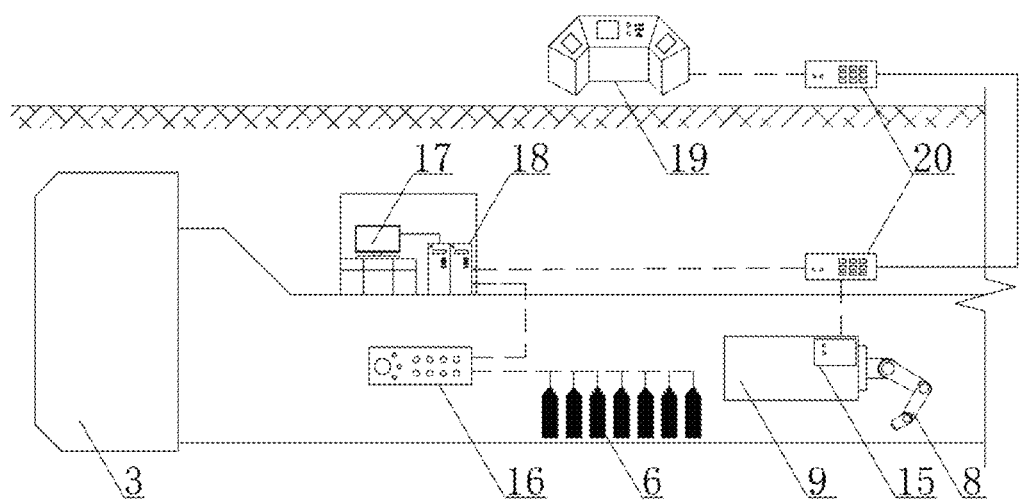
FIG. 8 is a topology diagram of the system according to an embodiment of the present disclosure.

With reference to FIG. 8, when the automatic microseismic monitoring-intelligent rockburst early warning integrated system for tunnel boring machine (TBM)-based construction is arranged with the communication, all the microseismic sensors 6 convert the monitored microseismic waves into analog electrical signals and transmit the analog electrical signals to the microseismic acquisition instrument 16 through cables. The microseismic acquisition instrument 16 converts the analog electrical signals into digital electrical signals and transmits the digital electrical signals to the microseismic monitoring server 18 through the network cables. The microseismic monitoring server 18 analyzes the digital electrical signals to obtain early warning digital electrical signals and transmits the early warning digital electrical signals to the TBM console 17 through the network cable for display. The above-mentioned analysis of the microseismic digital electrical signal to obtain the early warning digital electrical signals is the prior art, and the early warning digital electrical signals are also transmitted to the photoelectric converter 20 in the TBM through the network cable. The photoelectric converter 20 in the TBM converts the early warning digital electrical signals into optical signals and transmits the optical signals to the photoelectric converter 20 outside the tunnel through a long-distance optical fiber. The photoelectric converter 20 outside the tunnel converts the optical signals into digital electrical signals and transmits the digital electrical signals to the center console 19 for remote analysis by relevant technicians. In addition, the collaborative robot 8 is electrically connected to the collaborative robot control cabinet 15 through a network cable. Digital communication electrical signals of the third camera 12, the first camera 13, the second camera 14 and the collaborative robot control cabinet 15 are transmitted to the trolley 9 through a network cable. Digital communication electrical signals in the trolley 9 are transmitted to the photoelectric converter 20 in the TBM through a network cable. The photoelectric converter 20 in the TBM converts the digital communication electrical signals of the trolley 9 into communication optical signals and transmits the communication optical signals to the photoelectric converter 20 outside the tunnel through the optical fiber. The photoelectric converter 20 outside the tunnel converts the communication optical signals of the trolley 9 into electrical signals and transmits the electrical signals to the center console 19 through the network cable for remote monitoring and remote control by relevant technicians.

Figure 9:
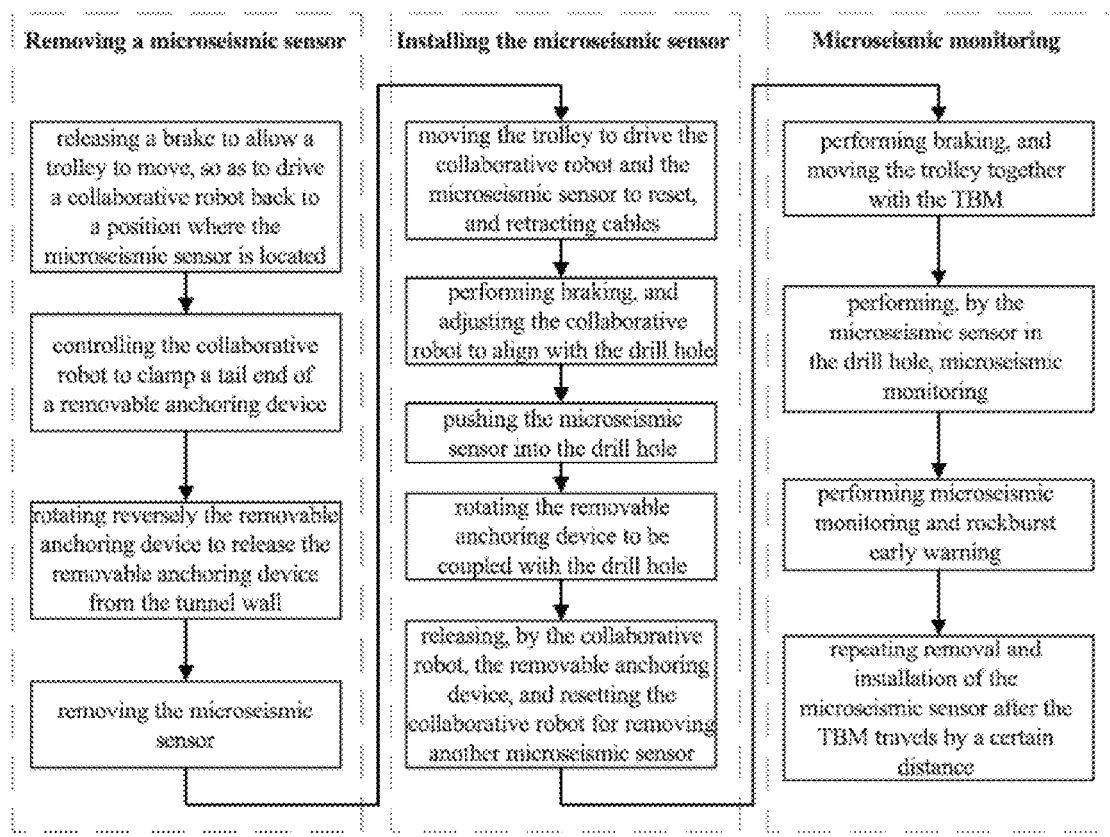
FIG. 9 is a flow chart illustrating control of removal and installation of the microseismic sensor.

2. Automatic Microseismic Monitoring-Intelligent Rockburst Early Warning Integrated Method Using the Automatic Microseismic Monitoring-Intelligent Rockburst Early Warning Integrated System With reference to FIGS. 8 to 9, the method includes steps (a1) to (c4).

Before removing the microseismic sensor 6, the trolley 9 is moved along the guide rail 10 to a position of the first microseismic sensor 6 (step a1). The collaborative robot 8 aligns with and clamps the tail end of the removable anchoring device 7 (step a2). The collaborative robot 8 rotates reversely the tail end of the removable anchoring device 7 to drive the microseismic sensor 6 to reversely rotate, so as to release the removable anchoring device 7 from the drill hole 5 (step a3). The collaborative robot 8 retracts to pull the microseismic sensor 6 and the removable anchoring device 7 out of the drill hole 5 (step a4).

The trolley 9 moves along the guide rail 10 to drive the collaborative robot 8 to move to a position corresponding to a new drill hole 5 with the microseismic sensor 6 and the removable anchoring device 7 (step b1). The trolley 9 is braked to prevent sliding, and the collaborative robot 8 is adjusted to allow the microseismic sensor 6 to align with the new drill hole 5 with the help of the first camera 13 and the third camera 12 (step b2). The collaborative robot 8 stretches to push the microseismic sensor 6 and the removable anchoring device 7 into the new drill hole 5 (step b3). The collaborative robot 8 rotates the tail end of the removable anchoring device 7 to spread the removable anchoring device 7 to be coupled with the new drill hole 5 (step b4). The collaborative robot 8 releases the tail end of the removable anchoring device 7; the collaborative robot 8 retracts to remove another microseismic sensor 6; and steps (a1) to (b5) are repeated until all microseismic sensors 6 are removed and installed (step b5).

The collaborative robot 8 is reset, and the trolley 9 moves back to an end of the guide rail 10 and starts the brake (step c1). When the TBM travels forward, all the component on the partition plate 31 in the main body of the TBM moves forward along with the TBM, and the microseismic sensor 6 is fixed in the drill hole 5 with a relative displacement with the TBM, and cables of the microseismic sensor 6 automatically releases by the micro seismic sensor festoon 4 (step c2). A real-time coordinate of the microseismic sensor 6 is calculated, and the monitored microseismic signals are analyzed and processed in combination with the real-time coordinate of the microseismic sensor. Analysis and processing results are output to the TBM console 17 and the center console 19 (step c3). It is determined whether a tunnelling distance of the TBM is greater than or equal to a reinstallation distance of the microseismic sensor. If so, the automatic removal and installation process of the microseismic sensor are triggered, and steps (a1) to (c4) are repeated; otherwise, the microseismic signals are continuously analyzed and processed (step c4).

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. An automatic microseismic monitoring-intelligent rockburst early warning integrated system for tunnel boring machine (TBM)-based construction, comprising:
    a partition plate arranged in a main body of a tunnel boring machine;
    a guide rail;
    a sensor festoon bracket;
    a trolley festoon bracket; and
    a trolley;
    wherein the guide rail, the sensor festoon bracket and the trolley festoon bracket are provided on the partition plate; the trolley is provided with a drive wheel adapted and connected to the guide rail; the sensor festoon bracket is provided with a microseismic sensor festoon, and the trolley festoon bracket is provided with a trolley festoon; the trolley is provided with a collaborative robot for clamping a removable anchoring device, and is also provided with a collaborative robot control cabinet connected to the collaborative robot; and the guide rail is provided with a graduation for marking a position of the trolley; and
    the trolley is further provided with a first camera and a second camera; the first camera is configured to observe a lining, a drill hole and the collaborative robot; the second camera is configured to observe rail segments in front of and behind the trolley and a coordinate of the trolley on the guide rail; and the collaborative robot is provided with a third camera for observing the drill hole and a microseismic sensor recovery device.

2. The automatic microseismic monitoring-intelligent rockburst early warning integrated system of claim 1, wherein network cables and power supply cables of the third camera, the first camera, the second camera and the collaborative robot control cabinet are all assembled into cables of the trolley and are maintained through the trolley festoon; a microseismic sensor is sleevedly provided in the removable anchoring device; and a cable of the microseismic sensor extends from the removable anchoring device at a position close to an end of the removable anchoring device clamped by the collaborative robot, and is maintained by the microseismic sensor festoon.

3. The automatic microseismic monitoring-intelligent rockburst early warning integrated system of claim 2, further comprising:
    a TBM console;
    a microseismic acquisition instrument;
    a center console; and
    a microseismic monitoring server;
    wherein the microseismic acquisition instrument is placed on a trailer of the TBM; a first photoelectric converter is provided on the trailer, and a second photoelectric converter is arranged outside the tunnel; and the center console is arranged outside the tunnel;
    the microseismic sensor is configured to convert monitored microseismic waves into analog electrical signals and transmit the analog electrical signals to the microseismic acquisition instrument; the microseismic acquisition instrument is configured to convert the analog electrical signals into microseismic digital electrical signals and transmit the microseismic digital electrical signals to the microseismic monitoring server; the microseismic monitoring server is configured to analyze the microseismic digital electrical signals to obtain early warning digital electrical signals, and transmit the early warning digital electrical signals to the TBM console for display; the microseismic monitoring server is also configured to transmit the early warning digital electrical signals to the first photoelectric converter; the first photoelectric converter is configured to convert the early warning digital electrical signals into optical signals and transmit the optical signals to the second photoelectric converter through an optical fiber; and the second photoelectric converter is configured to convert the optical signals into digital electrical signals and transmits the digital electrical signals to the center console;
    the collaborative robot is electrically connected to the collaborative robot control cabinet; and
    digital communication electrical signals of the third camera, the first camera, the second camera and the collaborative robot control cabinet are configured to be transmitted to the trolley; a digital communication electrical signal of the trolley is configured to be transmitted to the first photoelectric converter; the first photoelectric converter is also configured to convert the digital communication electrical signal of the trolley into a communication optical signal of the trolley and transmit the communication optical signal of the trolley to the second photoelectric converter; and
    the second photoelectric converter is also configured to convert the communication optical signal of the trolley into electrical signals and transmits the electrical signals to the center console.

4. An automatic microseismic monitoring-intelligent rockburst early warning integrated method using the automatic microseismic monitoring-intelligent rockburst early warning integrated system of claim 3, comprising:
    (a1) moving the trolley along the guide rail to a position of the microseismic sensor;
    (a2) controlling the collaborative robot to align with and clamp a tail end of the removable anchoring device;
    (a3) rotating reversely, by the collaborative robot, the tail end of the removable anchoring device to drive the microseismic sensor to reversely rotate, so as to release the removable anchoring device from the drill hole; and (a4) retracting the collaborative robot to pull the microseismic sensor and the removable anchoring device out of the drill hole;

(b1) moving the trolley along the guide rail to drive the collaborative robot with the microseismic sensor and the removable anchoring device to move to a position corresponding to a new drill hole;

(b2) starting a brake of the trolley to prevent sliding, and adjusting the collaborative robot to allow the microseismic sensor to align with the new drill hole with the help of the first camera and the third camera;

(b3) controlling the collaborative robot to stretch to push the microseismic sensor and the removable anchoring device into the new drill hole;

(b4) rotating, by the collaborative robot, the tail end of the removable anchoring device to spread the removable anchoring device to be coupled with the new drill hole; and (b5) controlling the collaborative robot to release the tail end of the removable anchoring device;

(c1) resetting the collaborative robot; moving the trolley back to an end of the guide rail, and starting the brake;

(c2) when the TBM travels forward, fixing the microseismic sensor in the new drill hole with a relative displacement with the TBM, and automatically releasing, by the microseismic sensor festoon, cables of the microseismic sensor;

(c3) calculating a real-time coordinate of the microseismic sensor, and analyzing and processing monitored microseismic signals in combination with the real-time coordinate of the microseismic sensor; and outputting analysis and processing results to the TBM console and the center console; and (c4) determining whether a tunnelling distance of the TBM is greater than or equal to a reinstallation distance of the microseismic sensor; if so, triggering automatic removal and installation of the microseismic sensor, and repeating steps (a1) to (c4); otherwise, continuing to analyze and process the microseismic signals.

* * * * *